(12) United States Patent
Britt et al.

(10) Patent No.: US 8,033,473 B2
(45) Date of Patent: Oct. 11, 2011

(54) PACKAGING FOR A PORTABLE CONSUMER DEVICE

(75) Inventors: Chris Britt, San Francisco, CA (US); Erin Pursell, New York, NY (US); Carrie Vriheas, San Francisco, CA (US); Karen Hyun, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 589 days.

(21) Appl. No.: 11/738,310

(22) Filed: Apr. 20, 2007

(65) Prior Publication Data

US 2008/0257966 A1 Oct. 23, 2008

(51) Int. Cl.
*G06K 19/00* (2006.01)

(52) U.S. Cl. ........................ 235/487; 235/493

(58) Field of Classification Search .................. 235/375, 235/380, 487, 493
See application file for complete search history.

(56) References Cited

U.S. PATENT DOCUMENTS

| | | | |
|---|---|---|---|
| 702,100 A | 6/1902 | Keller | |
| 1,641,110 A | 8/1927 | Wulfing | |
| 1,713,153 A | 5/1929 | Webber | |
| 2,075,529 A | 3/1937 | Leubrie | |
| D154,536 S | 7/1949 | Forschner | |
| 2,596,374 A | 5/1952 | Crapster | |
| D170,961 S | 12/1953 | Blish | |
| 2,896,290 A | 7/1959 | Salm et al. | |
| 3,127,089 A | 3/1964 | Freeman | |
| 3,255,869 A | 6/1966 | Keller | |
| 3,405,863 A | 10/1968 | Kugler | |
| 3,966,524 A | 6/1976 | Lehmacher | |
| 4,202,445 A * | 5/1980 | Porter | 206/37 |
| D270,622 S | 9/1983 | Hardy | |
| 4,442,936 A | 4/1984 | Densham | |
| 4,461,661 A | 7/1984 | Fabel | |
| 4,498,591 A | 2/1985 | Smith, II | |
| 4,576,316 A | 3/1986 | Foster | |
| 4,740,090 A | 4/1988 | McNamee | |
| 4,742,908 A | 5/1988 | Thomas et al. | |
| 4,890,936 A | 1/1990 | Cooper | |
| 4,907,359 A | 3/1990 | Berman | |
| 4,938,347 A | 7/1990 | Tillman | |
| D310,849 S | 9/1990 | Davis | |
| 5,106,090 A | 4/1992 | Greenwood | |
| 5,271,494 A | 12/1993 | Odermatt et al. | |
| 5,291,995 A | 3/1994 | von Agris et al. | |
| 5,308,121 A | 5/1994 | Gunn | |
| D347,994 S | 6/1994 | Hammond | |
| D350,983 S | 9/1994 | Penniman | |
| 5,380,046 A | 1/1995 | Stephens | |
| 5,409,153 A * | 4/1995 | Ristich | 224/661 |
| 5,443,154 A | 8/1995 | Hustad et al. | |
| D368,428 S | 4/1996 | Croft | |
| 5,609,253 A * | 3/1997 | Goade, Sr. | 206/460 |
| D382,668 S | 8/1997 | Dolan | |
| 5,667,247 A * | 9/1997 | Ramsburg et al. | 283/61 |

(Continued)

*Primary Examiner* — Daniel Hess
*Assistant Examiner* — Paultep Savusdiphol
(74) *Attorney, Agent, or Firm* — Kilpatrick Townsend & Stockton LLP

(57) ABSTRACT

A portable consumer device having an information bearing region is packaged with an anti-tampering member. The region includes information pertaining to an account associated with a payment processing system. With a permanent alteration of the anti-tampering member so as to make the region accessible, a merchant's point of service terminal can interact with the region so as to change a state of the account.

35 Claims, 9 Drawing Sheets

U.S. PATENT DOCUMENTS

| | | |
|---|---|---|
| 5,711,469 A | 1/1998 | Gormley et al. |
| 5,740,915 A * | 4/1998 | Williams .................... 206/555 |
| D394,604 S | 5/1998 | Cammack |
| 5,760,381 A | 6/1998 | Stich et al. |
| 5,777,305 A * | 7/1998 | Smith et al. ................. 235/380 |
| 5,842,629 A * | 12/1998 | Sprague et al. ................ 229/71 |
| 5,893,459 A | 4/1999 | Croft |
| 5,918,909 A | 7/1999 | Fiala et al. |
| 6,108,957 A | 8/2000 | Zapawa |
| 6,109,439 A * | 8/2000 | Goade, Sr. ................... 206/454 |
| 6,116,655 A | 9/2000 | Thouin et al. |
| 6,224,108 B1 * | 5/2001 | Klure ............................ 283/74 |
| 6,315,206 B1 * | 11/2001 | Hansen et al. ................ 235/487 |
| 6,328,341 B2 * | 12/2001 | Klure ............................ 283/62 |
| 6,439,613 B2 * | 8/2002 | Klure ............................ 283/62 |
| 6,457,863 B1 | 10/2002 | Vassallo |
| D474,235 S | 5/2003 | Haas |
| 6,561,657 B1 | 5/2003 | Schofield |
| D475,918 S | 6/2003 | Ajootian |
| 6,610,338 B2 | 8/2003 | Tang |
| 6,619,480 B2 * | 9/2003 | Smith .......................... 206/555 |
| D485,573 S | 1/2004 | Li |
| 6,715,795 B2 * | 4/2004 | Klure ............................ 283/62 |
| D494,632 S | 8/2004 | Gladstone |
| D494,999 S | 8/2004 | Cook, Jr. |
| 6,827,214 B2 | 12/2004 | Alzner et al. |
| D509,654 S | 9/2005 | Miller |
| 6,938,931 B1 | 9/2005 | Davis |
| 6,974,157 B1 | 12/2005 | Hammon |
| 7,000,844 B1 * | 2/2006 | Smith .......................... 235/487 |
| 7,005,170 B1 | 2/2006 | Simpson et al. |
| 7,028,892 B2 | 4/2006 | Morgan |
| 7,032,817 B2 | 4/2006 | Blank |
| 7,070,095 B1 | 7/2006 | Gandel et al. |
| 7,108,032 B1 * | 9/2006 | Whiteford et al. ........... 150/149 |
| D531,021 S | 10/2006 | Ashby et al. |
| 7,188,762 B2 * | 3/2007 | Goade et al. ................. 235/380 |
| 7,207,154 B2 | 4/2007 | Araujo |
| D545,689 S | 7/2007 | Peel |
| D546,705 S | 7/2007 | Suzuki |
| 7,237,676 B2 | 7/2007 | Celia |
| 7,252,225 B2 * | 8/2007 | Schultz et al. ............... 235/380 |
| 7,278,570 B2 | 10/2007 | McGee et al. |
| 7,322,519 B2 * | 1/2008 | Blank et al. .................. 235/380 |
| D561,604 S | 2/2008 | Galor |
| 7,367,504 B2 * | 5/2008 | Lewis et al. .................. 235/449 |
| 7,404,488 B2 | 7/2008 | Verbruggen et al. |
| 7,413,079 B2 | 8/2008 | Hermansson et al. |
| 7,482,925 B2 * | 1/2009 | Hammad et al. .......... 340/572.1 |
| 7,490,720 B2 | 2/2009 | Cole et al. |
| 2001/0027834 A1 * | 10/2001 | Southwick ................... 150/108 |
| 2002/0091573 A1 * | 7/2002 | Hodes ............................ 705/17 |
| 2002/0153414 A1 * | 10/2002 | Stoutenburg et al. ......... 235/380 |
| 2002/0185855 A1 * | 12/2002 | Klure ............................ 283/62 |
| 2003/0042732 A1 | 3/2003 | Wright |
| 2003/0150763 A1 | 8/2003 | Chen |
| 2003/0188815 A1 | 10/2003 | Hart |
| 2004/0074799 A1 | 4/2004 | Bell et al. |
| 2004/0139318 A1 * | 7/2004 | Fiala et al. .................... 713/165 |
| 2004/0237360 A1 * | 12/2004 | Nelms et al. .............. 40/124.04 |
| 2005/0011776 A1 | 1/2005 | Nagle |
| 2005/0045503 A1 | 3/2005 | Wong et al. |
| 2005/0180550 A1 * | 8/2005 | McGee et al. ............ 379/88.18 |
| 2005/0205663 A1 * | 9/2005 | Algiene ....................... 235/380 |
| 2005/0279825 A1 * | 12/2005 | Ashby et al. ................. 235/380 |
| 2006/0006225 A1 * | 1/2006 | Goade et al. ................. 235/380 |
| 2006/0044206 A1 * | 3/2006 | Moskowitz et al. .......... 343/841 |
| 2006/0091202 A1 | 5/2006 | McInnis |
| 2006/0131398 A1 * | 6/2006 | Lewis et al. .................. 235/380 |
| 2006/0151348 A1 | 7/2006 | Willard |
| 2006/0187061 A1 * | 8/2006 | Colby ........................ 340/572.8 |
| 2006/0206436 A1 * | 9/2006 | James et al. .................... 705/65 |
| 2006/0255154 A1 * | 11/2006 | Newbrough et al. ......... 235/486 |
| 2006/0273153 A1 * | 12/2006 | Ashby et al. ................. 235/380 |
| 2006/0290501 A1 * | 12/2006 | Hammad et al. .......... 340/572.1 |
| 2007/0013521 A1 | 1/2007 | Lindsay et al. |
| 2007/0040030 A1 * | 2/2007 | Kranzley et al. ............. 235/451 |
| 2007/0057040 A1 * | 3/2007 | Blank et al. .................. 235/380 |
| 2007/0063021 A1 * | 3/2007 | Chakiris et al. .............. 235/380 |
| 2007/0074799 A1 | 4/2007 | Nakane et al. |
| 2007/0109130 A1 * | 5/2007 | Edenfield ................... 340/572.8 |
| 2007/0131323 A1 * | 6/2007 | Stewart-Stand .............. 150/131 |
| 2007/0246527 A1 * | 10/2007 | Tang ............................ 235/380 |
| 2007/0252381 A1 | 11/2007 | Weisz et al. |
| 2008/0116283 A1 * | 5/2008 | Newbrough et al. ......... 235/487 |
| 2008/0217401 A1 | 9/2008 | Birkeland et al. |
| 2008/0223914 A1 | 9/2008 | Choi |
| 2008/0257956 A1 | 10/2008 | Grannan et al. |
| 2008/0257966 A1 | 10/2008 | Britt et al. |

* cited by examiner

PACKAGING FOR A PORTABLE CONSUMER DEVICE

BACKGROUND

Portable consumer devices, such as prepaid cards, have gained acceptance in the transaction industry and increased usage amongst consumers. They provide a convenient method for conducting transactions and transferring funds.

The growth of the portable consumer devices as a payment category has resulted in part to their widespread availability in retail stores, convenience stores, self-service terminals, and supermarkets. Some portable consumer devices are merchant specific wherein they cannot be activated, loaded, reloaded or used in stores other than the merchant's store, such as the Starbucks™ card; other types of merchant specific cards, such as a Barns and Nobles® gift card, can be loaded through a third party, such as a supermarket with an agreement with Barns and Nobles®, but the card can still only be used at the merchant's store. Yet other types of portable consumer devices, such as a debit gift card, have a broader range of usage, being accepted by most merchant stores that accept ordinary credit or debit cards; however, they can only be loaded at merchant stores specifically set up for loading of that particular portable consumer device.

Currently, a portable consumer device is often loaded based on information, such as bar code information, on a package. Bar code loading of the portable consumer device may result in extra processing steps in order for the portable consumer device information to enter a transaction payment processing system, such as a credit or debit card company's payment processing system. For example, after specifically setting up for loading of a portable consumer device, a merchant store may have to use a third party to associates the bar code information to the portable consumer device and send the information to a transaction processing system. Current methods, systems, and apparatus for loading of portable consumer devices may cause error and delay in the activation of the portable consumer device and may not carry with them the convenience of a transaction processing system, such as a payment processing system, that may have standardized methods and rules.

Moreover, fraud issues hinder the development of methods, systems and apparatus for loading of a portable consumer device loading based on account information, such as when the portable consumer device is loaded based on information on the packaging. For example, an issuer of a portable consumer device may scan a bar code on the packaging to activate the portable consumer device within the packaging. However, prior to the scanning of the bar code on the package, a thief may have opened the packaging of the portable consumer device, replaced the original portable consumer device with a substitute item, and waited for the merchant to scan the package containing the substitute item thereby activating the original portable consumer device in the possession of the thief. Thereafter, the thief can deplete the stored value on the original portable consumer device.

It would be desirable to provide methods, systems, and apparatuses that facilitate safely changing the state of a portable consumer device.

SUMMARY

The present invention includes apparatuses, methods, and systems for a portable consumer device having an anti-tampering member. In one implementation, the apparatus includes a substrate, such as a payment card, having an information bearing region pertaining to a payment processing system, such as a magnetic stripe and a cover that has a breakable anti-tampering member. When the anti-tampering member is unbroken, the cover covers the region and substantially prevents interaction of the region with a point of service terminal, such as a magnetic stripe reader. When the anti-tampering member is broken, however, the region can be exposed permitting interaction of the region with the point of service terminal. Moreover, the breaking of the anti-tampering member substantially, permanently alters the cover, making tampering with the portable consumer device detectable. The anti-tampering member may be a perforation on the cover that a merchant can break during checkout.

In one implementation, the method includes breaking an anti-tampering member of a cover substantially covering a portable consumer device, the portable consumer device having an information bearing region pertaining to an account associated with a payment processing system and interacting the region with the point of service terminal that is in communication with the payment processing system. The method may also include forming a transmission to the payment processing system, the transmission including information obtained from the interaction of the point of service terminal with the region and changing a state of the account.

In one implementation, the system includes a merchant checkout including a rack displaying a plurality of portable consumer devices and a point of service terminal that is in communication with a payment processing system. Each of the portable consumer devices includes a substrate having an information bearing region pertaining to a payment processing system, an anti-tampering member, and a cover substantially covering the region. When the anti-tampering member is unbroken, the cover substantially prevents interaction of the information bearing region with a point of service terminal; when the anti-tampering member is broken, the breaking of the anti-tampering member permits interaction of the information bearing region with the point of service terminal. The merchant checkout may also have a user passage way, such as a consumer passage way, joining the rack to the point of service terminal, wherein the consumer passage way is used to transport the consumer device from the rack to the point of service terminal.

DESCRIPTION OF THE DRAWINGS

Additional aspects of the present invention will become evident upon reviewing the non-limiting embodiments described in the specification, the appendices and the claims taken in conjunction with the accompanying figures, wherein like numerals designate like elements.

DETAILED DESCRIPTION

In one implementation, a portable consumer device has a cover with an anti-tampering member that may be frangible. After breaking the cover's anti-tampering member a merchant may change the state of an account associated with the portable consumer device. The state of the account associated with the portable consumer device can be changed through actions including: activation, deactivation, and transformation of value of the account associated with the portable consumer device such as an increase or decrease of value that may occur through loading, reloading, or transferring of value.

A transaction involves the exchange of a unit of value. For example, a transaction can involve purchasing goods or services, the redemption of loyalty incentives, or the transfer of information associated with a purchase of a good or service. The unit of value of the account associated with a portable consumer device may include: a dollar value, a point value, a game value such as a lottery number, a ticket value such as a ticket for a game or an amusement park ride, a discount value such as coupons, a rebate value, a credit value, or a data unit such as a name, an account number, a medical record, or a prescription. The unit of value may be stored in the memory of the portable consumer device. Alternatively, or in combination, the unit of value may be stored in a database within the payment processing system.

Figure 1:
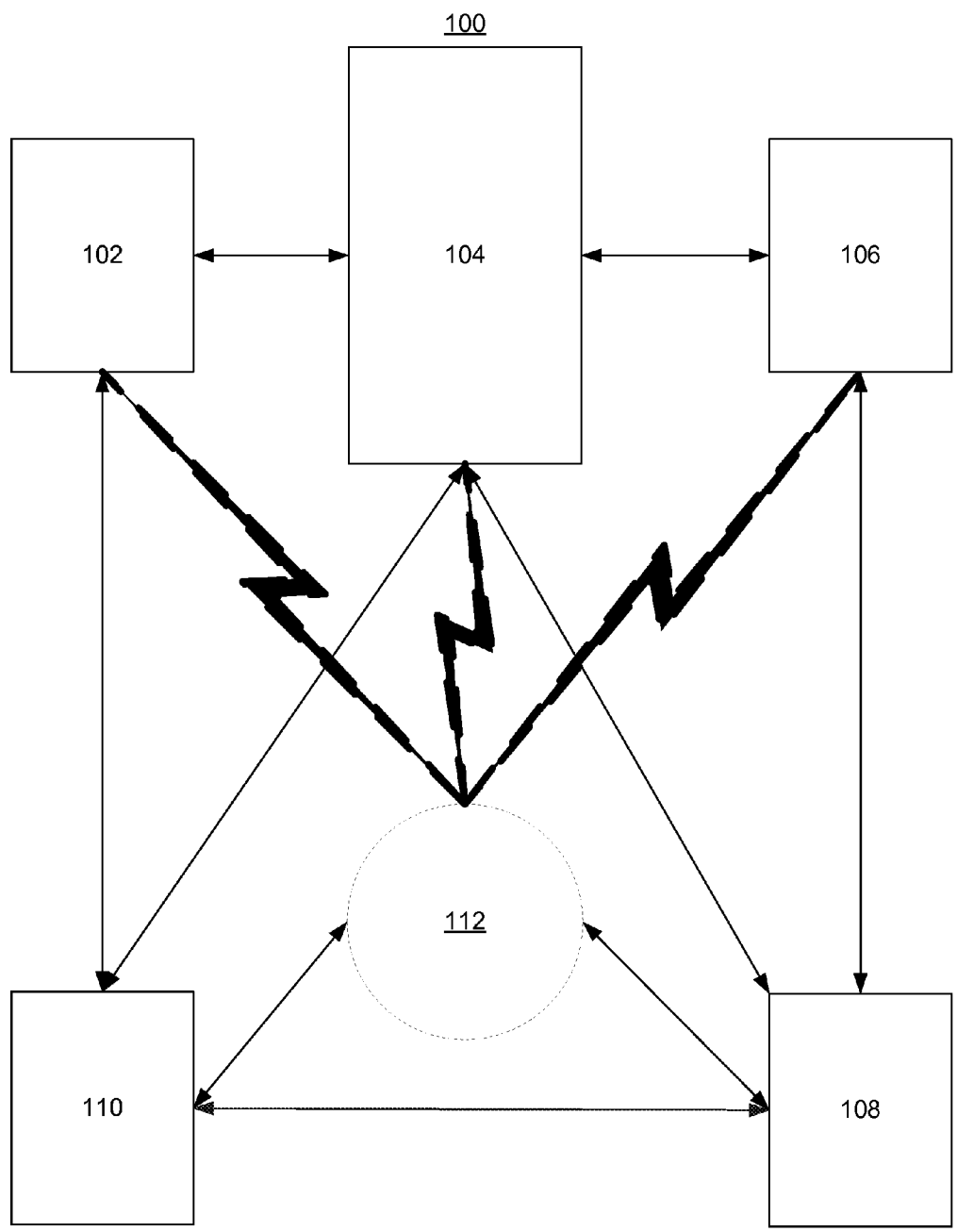
FIG. 1 is a block level diagram illustrating an exemplary payment processing system.

Referring to FIG. 1, in general, a transaction includes participation from different entities of a payment processing system 100 including an issuer 102, a transaction handler 104 such as a credit card company, an acquirer 106, a merchant 108, or a user 110 such as an account holder. The acquirer 106 and the issuer 102 can communicate through the transaction handler 104. The merchant 108 may be a person or entity that sells goods or services. Merchants 108 include: a manufacturer, a distributor, a retailer, a load agent, a drugstore, a grocery store, a gas station, a hardware store, a supermarket, a boutique, a restaurant, or a doctor's office. In a business-to-business setting, the user 110 may be a second merchant making a purchase from the merchant 108. The merchant 108 may utilize at least one point of service (POS) terminal that can communicate with the acquirer 106, the transaction handler 104, or the issuer 102. Thus, the POS terminal is in operative communication with the payment processing system 100.

Typically, a transaction begins with the user 110, such as an account holder or a cardholder, presenting a portable consumer device 112 to the merchant 108 in exchange for a good or service. The portable consumer device 112 may include a payment card, a gift card, a smartcard, a smart media, a payroll card, a health care card, a wrist band, a machine readable medium containing account information, a keychain device such as the SPEEDPASS® commercially available from Exxon-Mobil Corporation or a supermarket discount card, a cellular phone, personal digital assistant, a pager, a security card, an access card, a wireless terminal, or a transponder. The portable consumer device 112 may also include volatile or non-volatile memory to store information such as the account number or an account holder's name.

The merchant 108 may use the POS terminal to obtain account information, such as an account number, from the portable consumer device 112. The portable consumer device 112 may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer 102 of the portable consumer device 112. Alternatively, or in combination, the portable consumer device 112 may communicate, directly and/or indirectly, with the issuer 102, the transaction handler 104, or the acquirer 106 such as through one or more networks.

The issuer 102 may authorize the transaction using the transaction handler 104. The transaction handler 104 may also clear the transaction. Authorization includes the issuer 102, or the transaction handler 104 on behalf of the issuer 102, authorizing the transaction in connection with the issuer's 102 instructions such as through the use of business rules. The business rules could include instructions or guidelines from the transaction handler 104, the user 110, the merchant 108, the acquirer 106, the issuer 102, a financial institution, or combinations thereof. The transaction handler 104 may maintain a log or history of authorized transactions. Once approved, the merchant 108 will record the authorization, allowing the user 110 to receive the good or service.

The merchant 108 may, at discrete periods, such as the end of the day, submit a list of authorized transactions to the acquirer 106 or other components of the payment processing system 100. The transaction handler 104 may compare the submitted authorized transaction list with its own log of authorized transactions. If a match is found, the transaction handler 104 may route authorization transaction amount requests from the corresponding acquirer 106 to the corresponding issuer 102 involved in each transaction. Once the acquirer 106 receives the payment of the authorized transaction amount from the issuer 102, it can forward the payment to the merchant 108 less any transaction costs, such as fees. If the transaction involves a debit or pre-paid card, the acquirer 106 may choose not to wait for the initial payment prior to paying the merchant 108.

There may be intermittent steps in this process, some of which may occur simultaneously. For example, the acquirer 106 can initiate the clearing and settling process, which can result in payment to the acquirer 106 for the amount of the transaction. The acquirer 106 may request from the transaction handler 104 that the transaction be cleared and settled. Clearing includes the exchange of financial information between the issuer 102 and the acquirer 106 and settlement includes the exchange of funds. The transaction handler 104 can provide services in connection with settlement of the transaction. The settlement of a transaction includes depositing an amount of the transaction settlement from a settlement house, such as a settlement bank, which the transaction handler 104 typically chooses, into a clearinghouse, such as a clearing bank, that the acquirer 106 typically chooses. The issuer 102 deposits the same from a clearinghouse, such as a clearing bank, which the issuer 102 typically chooses into the settlement house. Thus, a typical transaction involves various entities to request, authorize, and fulfill processing the transaction.

Figure 2:
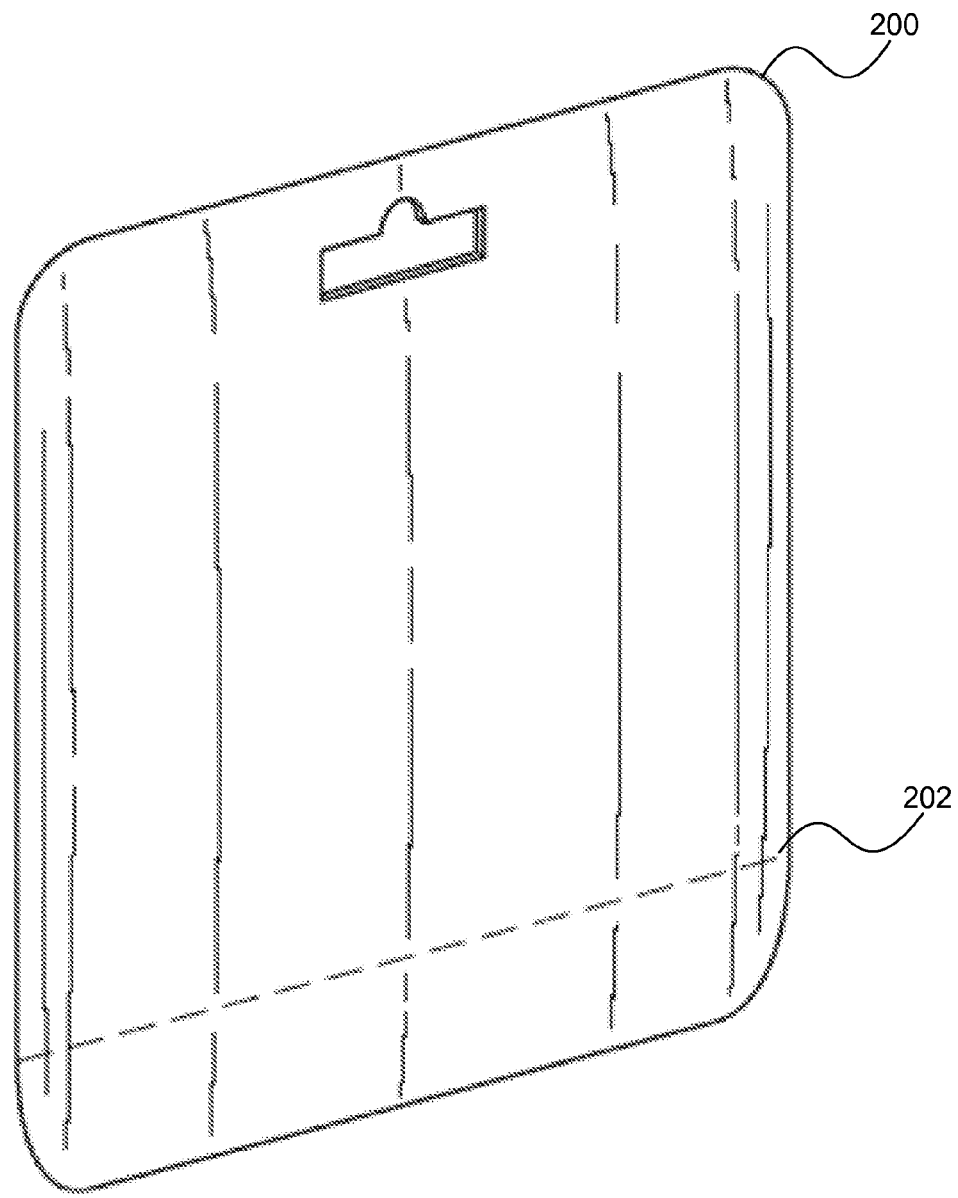
FIG. 2 is a perspective view of an exemplary portable consumer device having packaging that includes an anti-tampering member, where the portable consumer device has utility in the system illustrated in FIG. 1.
Figure 3:
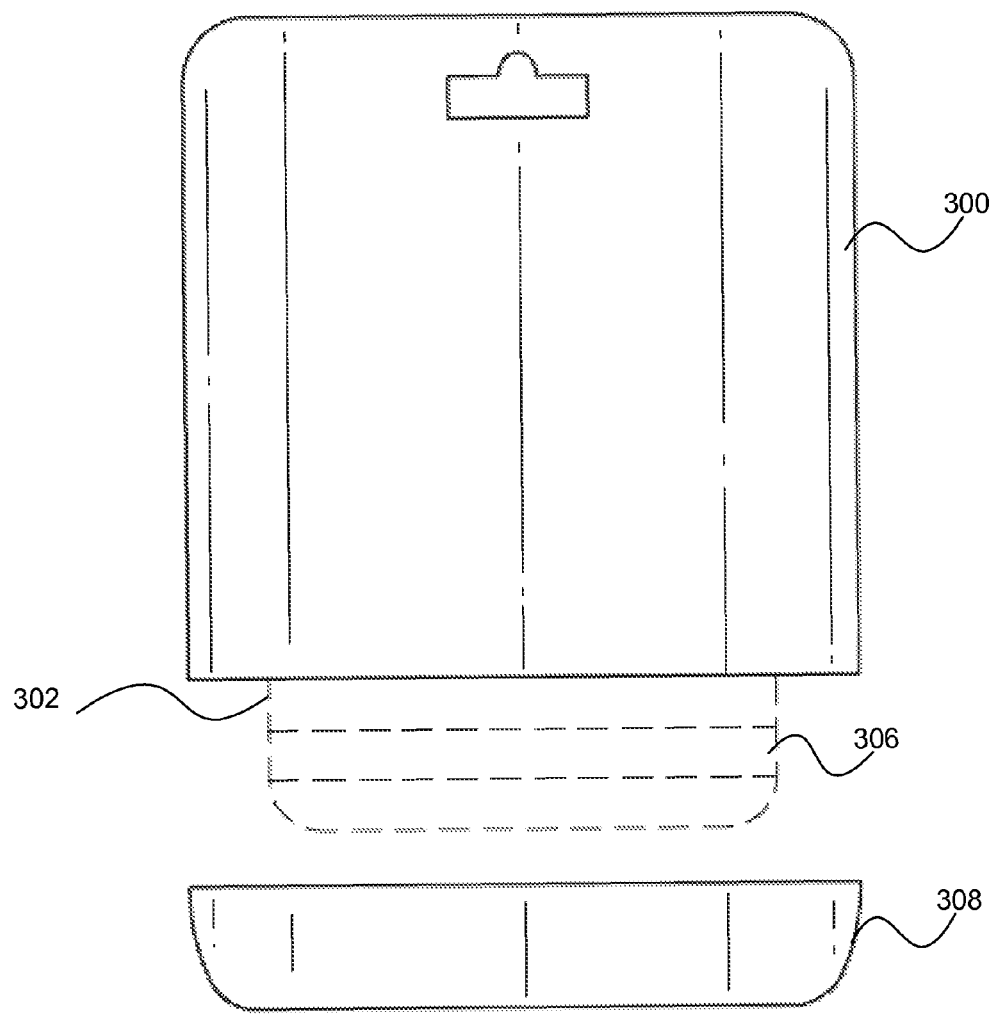
FIG. 3 is a front elevational exploded view of the portable consumer device of FIG. 2, the exploded view showing an exposed region of a payment card.
Figure 4:
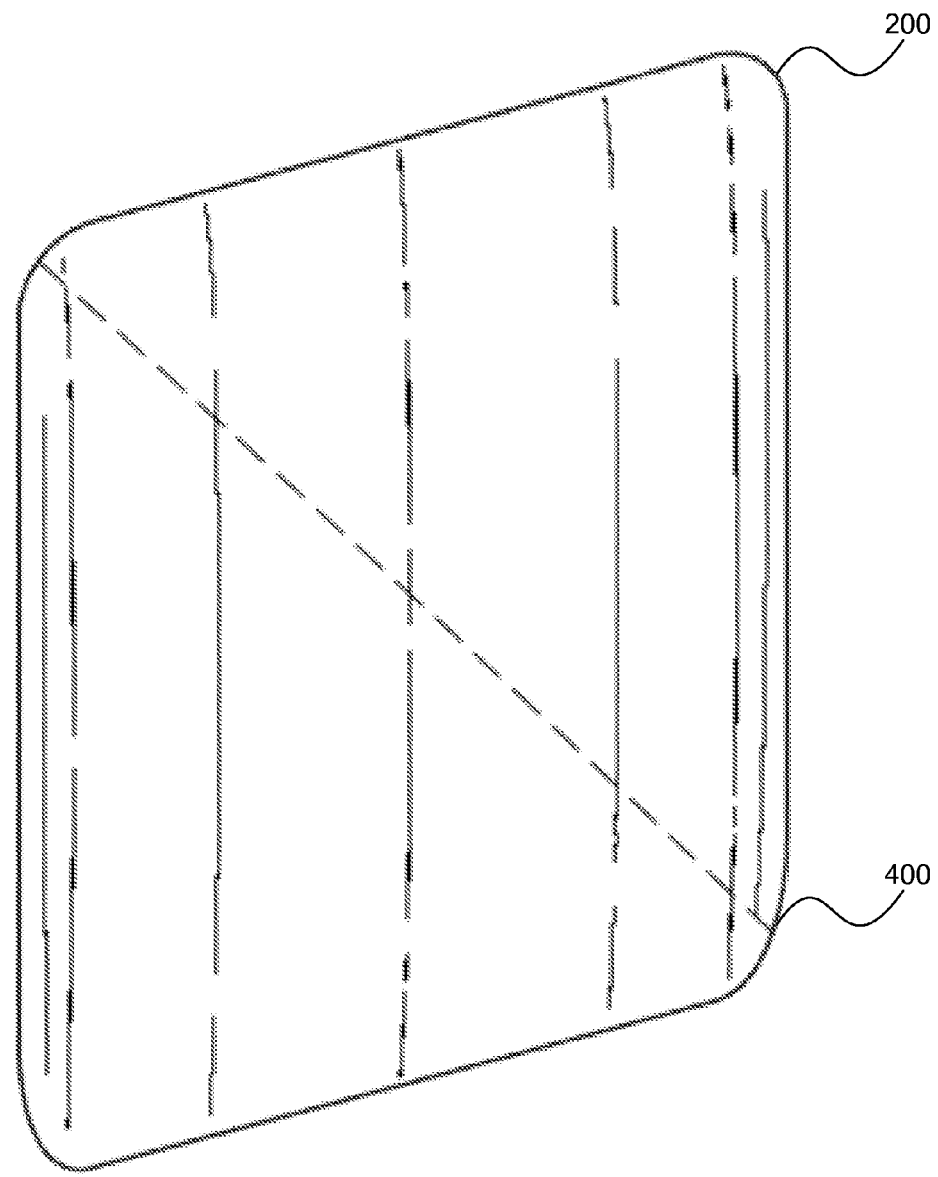
FIG. 4 is a perspective view of an exemplary portable consumer device having packaging that includes an anti-tampering member, where the portable consumer device has utility in the system illustrated in FIG. 1.
Figure 5:
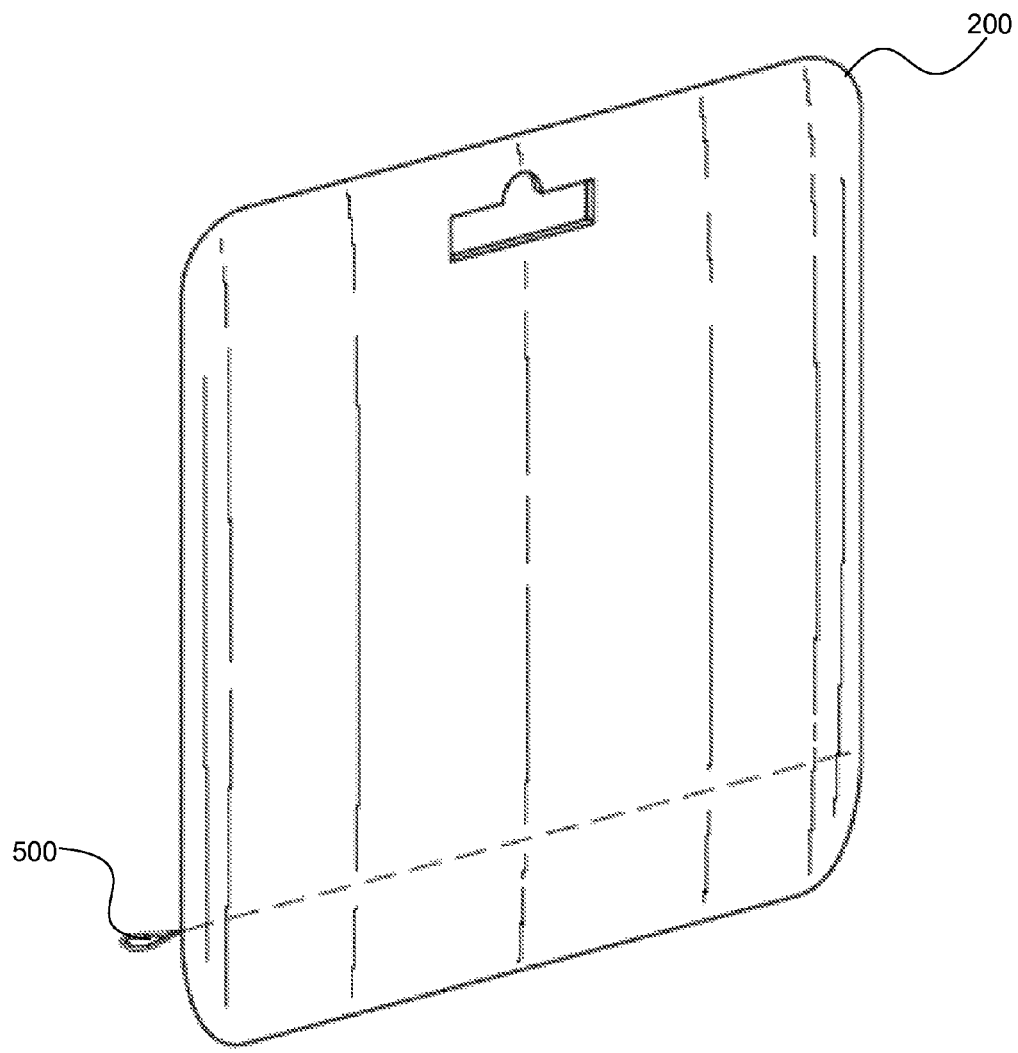
FIG. 5 is a perspective view of an exemplary portable consumer device having packaging that includes an anti-tampering member, where the portable consumer device has utility in the system illustrated in FIG. 1.
Figure 6:
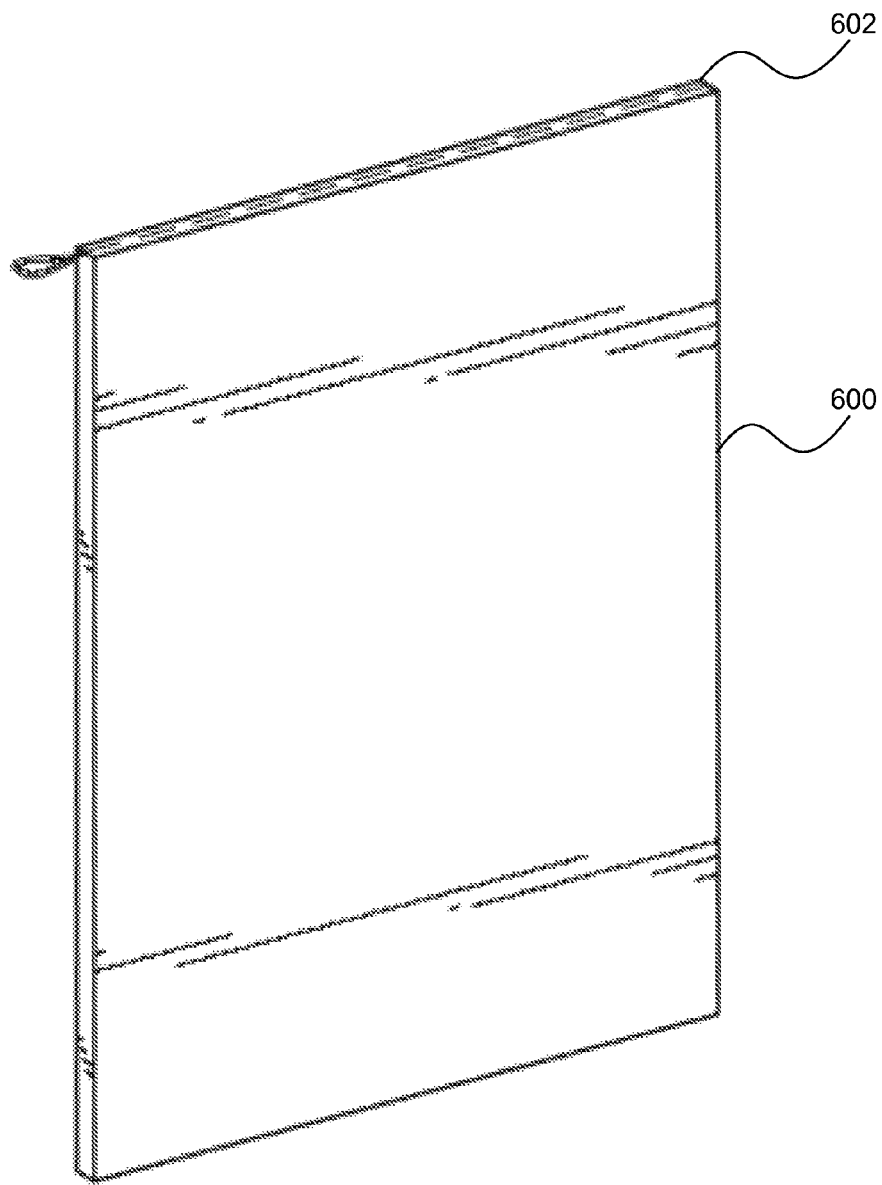
FIG. 6 is a perspective view of an exemplary portable consumer device having packaging in a closed position thereof that includes an anti-tampering member, where the portable consumer device has utility in the system illustrated in FIG. 1.
Figure 7:
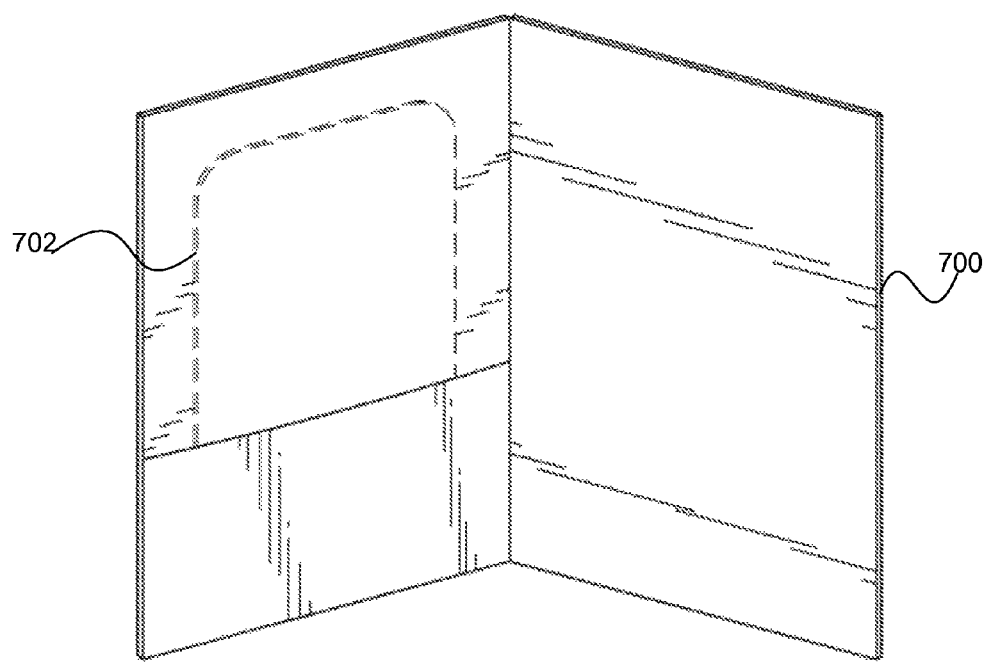
FIG. 7 is a perspective view of the portable consumer device seen in FIG. 6 having packaging in an open position after an alteration of the anti-tampering member, where the anti-tampering member has been alternated to show an exposed region of a payment card seen in phantom, and where the payment card has utility in the system illustrated in FIG. 1.

Referring to FIGS. 2-3, there is illustrated an implementation of a portable consumer device further represented a reference numeral 112 in FIG. 1. The portable consumer device 112 of FIGS. 2-3 may include a substrate 302 having an information bearing region pertaining to the payment processing system 100. For example, the information bearing region can be a magnetic stripe 306 or a device for receiving, transmitting, or transreceiving a radio frequency such a Radio Frequency Identification (RFID) device. As such, substrate 302 can be a payment card having an information bearing region thereon. The cover 200 may enclose the portable consumer device 112. Alternatively, a coating may be applied over the region that can bear information pertaining to a payment processing system 100. The information pertaining to a payment processing system 100 may be an account number associated with the portable consumer device 112, an account holder's name, an activation state, an expiration date, a verification code such as a personal identification number, a value associated with an account within the payment processing system 100, or combinations thereof.

The cover 200 has an anti-tampering member that may be frangible, such as a perforation 202. When the anti-tampering member is unbroken, the cover 200 hides at least the region that can bear information substantially preventing interaction of the region with a POS terminal. For example, cover 200 may hide the magnetic stripe 306, a number associated with the account, or cover 200 may shield a radio frequency signal of a radio frequency type portable consumer device 112.

In some implementations, the breaking of the anti-tampering member moves a portion of the cover relative to the portable consumer device 112 so as to expose the region that may be machine-readable, thus permitting interaction of the region with a POS terminal. Moreover, the breaking of the anti-tampering member substantially permanently alters the cover, therefore tampering with the portable consumer device 112, substantially detectable. For example, a complete breakage of the perforation 202 results in separating the cover 200 into multiple unconnected pieces such as a first piece 300 and a second piece 308. As such, a complete breakage of the perforation 202 is visibly detectable. The breakage of the perforation 202 need not separate the cover 200 into unconnected pieces, for example, the perforation may be broken only partially so as leave the first piece 300 and the second piece 308 connected. The breaking of the anti-tampering member need not be visibly detectable to the naked eye. For example, a breakage of the anti-tampering member may otherwise detected, such as through the use of an optical, magnetic, or electromagnetic frequency signal reader.

The cover 200 may have other configurations. Referring to FIGS. 4-8, different implementations of a portable consumer device 112 having covers and anti-tampering members are presented. For example, as an alternative to the perforation 202 seen in FIG. 2, a perforation in packaging of the portable consumer device 112 may have a different pattern or a different location than that shown in FIG. 2; The perforation may be substantially extending fully across the cover, or the perforation may be configured diagonally as shown at reference numeral 400 across the cover. The cover may have a string connection 500, where the string joins multiple pieces of the cover, and where pulling the string makes it possible to move a portion 308 of the cover relative to the portable consumer device 112. The perforation 202 or string 500 on the cover may be located in the circumference 600 of the cover. For example, the cover of the portable consumer device 112 may be a greeting card 700 having a sleeve to contain a reloadable card 702, where a string 602 on the circumference 600 of the packaging of the portable consumer device 112 is pulled in order to open up the package so as to expose both an internal surface of the greeting card 700 and the reloadable card 702.

In some implementations, the cover for the portable consumer device 112 may be made of material that can be removed from the portable consumer device's 112 region that can bear information, such as by manual abrasion. For example, the material can be scratched off to reveal there beneath the magnetic stripe 306 or an account number that has been printed on a payment card.

A payment card inside the packaging of the portable consumer device 112 may be attached to packaging. Such an attachment can be mechanical, chemical, or magnetic. For example, the attachment can be made by the use of an adhesive substance such as glue or a temporary adhesive gel placed on one side of a payment card that is in contact with the packaging of the portable consumer device 112. Alternatively, a portion of the payment card might be held in contact with a portion of the packaging of the portable consumer device 112 by use of a holding means. Here, the holding means could be a rivet, a tack, a bolt, a hinge, a conventional attachment device, or combinations thereof.

Figure 8:
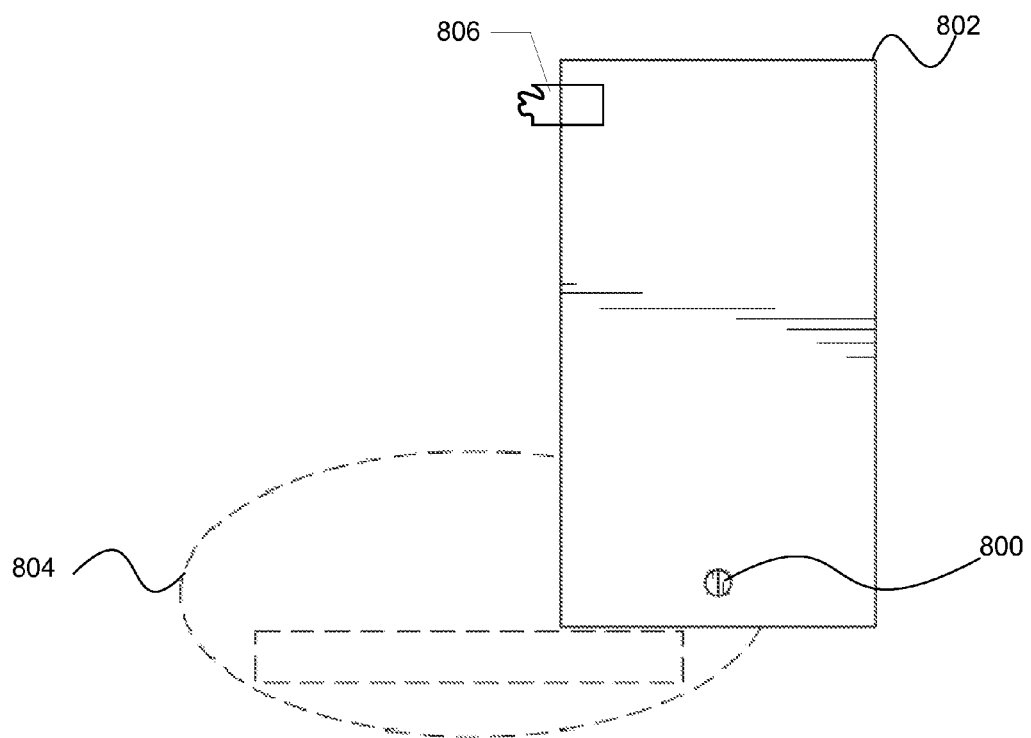
FIG. 8 is a perspective view of an exemplary portable consumer device having packaging that includes an anti-tampering member and a payment card seen in phantom, where the anti-tampering member is shown in an altered condition, where the payment card seen in phantom has been rotated outside of the packaging, and where the payment card has utility in the system illustrated in FIG. 1.

In one implementation of a portable consumer device 112 seen in FIG. 8, a hinge 800 holds a portion of a cover 802 in contact with a portion of a payment card 804 having a information bearing region, where both the payment card and its information bearing regions are shown in phantom. An anti-tampering member seen at reference numeral 806 is illustrated as having been broken due to the forceful pivoting of the cover 802 about the hinge 800 so as to move the payment card outside of cover 802. Alternatively, or in addition, a frangible member (not shown) may be located within the center of the hinge 800, which, upon pivoting payment card 804 about hinge 800 for the first time, causes the frangible member to break and dislodge from within hinge 800 to leave a visible discernable and permanent alternation of hinge 800. As such, both the frangible member within hinge 800 (not shown) and the breakable member seen at 806 can be anti-tampering members that are permanently altered by pivoting payment card 804 about hinge 800, thereby making the breakage of the anti-tampering members substantially visually detectably. Moreover, when the anti-tampering members are broken, the now exposed information bearing region on the payment card 804 can interact with the POS terminal for the payment processing system 100.

Packaging for the portable consumer device 112 may be made of any suitable material. For example, the packaging can be made of paper, plastic, cardboard, cloth, metal, or combination thereof. The material can be opaque in color or clear. The material can have an electronic or magnetic signal shielding quality. For example, the packaging may comprise radio frequency signal shielding. When the portable consumer device 112 has its shielding removed, the portable consumer device 112 may then interact with the POS terminal. While the portable consumer device 112 remains within this shielding, an electronic or magnetic signal reader will not be able to change the state of a payment card within the packaging of the portable consumer device 112.

The portable consumer device 112 may remain intact within a first portion 300 of the packaging 200. For example, a prepaid card may remain within the first portion 300 of the packaging 200 through the use of an adhesive, a grip, or other connection means. In this manner, if the user 110 gifts the card to a second user, the first portion 300 of the packaging 200 can also be given to the second user. The first portion 300 of the packaging 200 may have information including information about the portable consumer device 112, the issuer 102 that supports the portable consumer device 112, the transaction handler 104 that supports the portable consumer device 112, instructions for changing the state of a payment card within the packaging of the portable consumer device 112, or other information. The first portion 300 of the packaging 200 can also bear various indicia, such as advertisements and logos.

Figure 9:
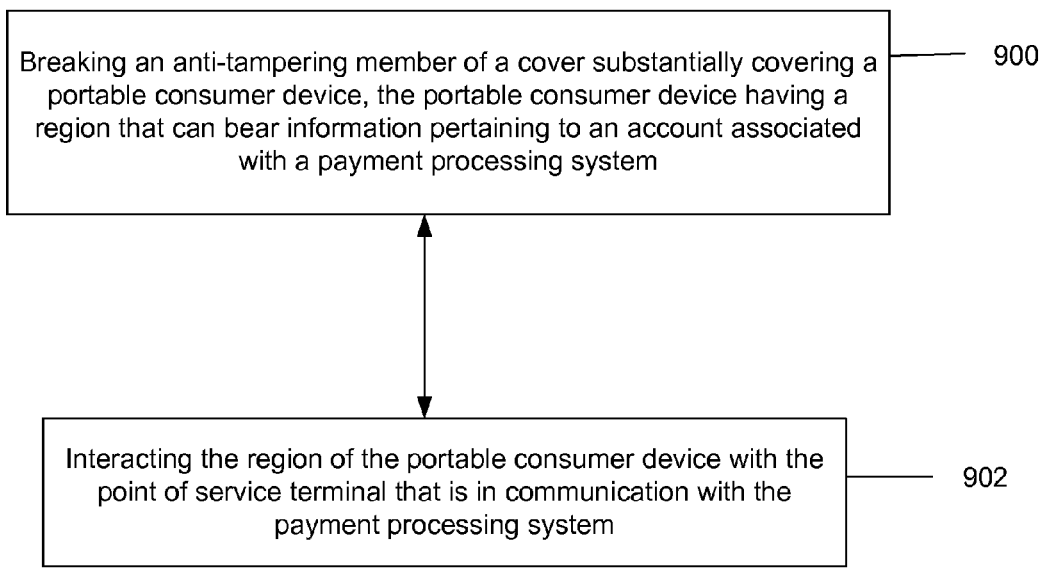
FIG. 9 is a flow chart illustrating an exemplary process for using, within the system illustrated in FIG. 1, a portable consumer device having an anti-tampering member.

Referring to FIG. 9, a method for utilizing a portable consumer device 112 begins at step 900. Other implementations can have more or fewer steps. At step 900, an anti-tampering member such as the perforation 202 of the cover 200 substantially covering the portable consumer device 112 is broken. For example, a user 110, such as a customer, may pick up a debit card from a rack displaying a plurality of covered debit cards at the merchant's 108 store, the merchant 108 being any business that has a normal POS terminal that is in operative communication with a payment processing system 100. The user 110 can hand the debit card to the merchant 108 to purchase the debit card and place a value in an account associated with the debit card. This purchase can be made, for example, by using a merchant's checkout system or POS terminal. The merchant 108 may then break the anti-tampering member of the portable consumer device 112 by tearing the cover 200 along the perforation 202. The tearing action then exposes a payment card and particularly the information bearing region on the payment card. Alternatively, or in combination, the merchant 108 may rotate the cover 802 about the hinge 800 so as to break one or more anti-tampering members, thereby and exposing the information bearing region on the payment card.

At step 902, the merchant interacts the exposed information bearing region of the portable consumer device 112 with the merchant's POS terminal that is in communication with the payment processing system 100. For example, the merchant 108 may swipe the magnetic stripe 306 of the payment card in a magnetic stripe reader, or may pass a transponder located within an information bearing region on substrate 302 so as to be proximal a radio frequency reader to thereby detect a signal bearing information from the transponder, or the merchant may optically scan a bar code on the substrate 303 with an optical reader. Other General Packet Radio Service techniques for communicating data from the information bearing region of substrate 302 to a POS terminal are also contemplated and deemed various implementations of the present invention.

Once the region of the portable consumer device 112 is interacted with the POS terminal, the state of an account associated with a payment processing system 100 can be changed, where that account can correspond to information contained in the information bearing region of substrate 302 or as seen within reference numeral 804.

The merchant 108 may use the POS terminal to compose a transmission to the payment processing system 100, the transmission including information obtained from the interaction of the POS terminal with the information bearing region within the portable consumer device 112. For example, the merchant 108 may send a transaction authorization request to the issuer 102 of the portable consumer device 112 using the POS terminal. The merchant 108 can receive at the POS terminal an indication whether the issuer 102 of the portable consumer device 112 has authorized or not authorized the transaction authorization request. If the issuer 102 of the portable consumer device 112 has authorized the transaction authorization request, the merchant 108 can then change the state of the account by activating the account, loading the account with a value, reloading the account with a value, transitioning a value associated with the account, decreasing a value associated with the account, increasing a value associated with the account, or transferring a value associated with the account.

In another implementation, a merchant checkout system includes a POS terminal in communication with a payment processing system and a rack displaying portable consumer devices 112 each including a substrate having an information bearing region pertaining to a payment processing system, an anti-tampering member, and packaging substantially covering the information bearing region. When the anti-tampering member is unbroken, the packaging of the consumer portable device will substantially prevent interaction of the information bearing region of the consumer portable device with a POS terminal. When the anti-tampering member is broken, the packaging of the consumer portable device will not prevent interaction of the information bearing region of the consumer portable device with the POS terminal. Rather, the breaking of the anti-tampering member permits interaction of the information bearing region with the POS terminal.

The merchant checkout may also include a user passage way, such as a consumer passage way, joining the rack to the POS terminal. A consumer can then take one of the consumer portable devices off of the rack and transport it to the POS terminal. Once at the POS, the merchant can alter an anti-tampering of the consumer portable device so as to permit an interaction of an information bearing region of the portable consumer device 112 with the POS terminal. The POS terminal can then form a transmission addressed to the payment processing system, where the transmission can include information obtained from the interaction of the POS terminal with the information bearing region of the portable consumer device 112.

The merchant 108 may receive the transaction history of the portable consumer device 112 from the payment processing system. For example, each portable consumer device 112 may have a serial number. A merchant 108 may receive a batch of sequential serial numbers to sell in the merchant's 108 store. The payment processing system 100 may keep track of portable consumer devices 112 that were activated at a merchant 108 location. When the sequence of activated portable consumer devices 112 is not consistent with the sequence of the merchant's 108 batch of sequential serial numbers, a circumstance of fraud may have occurred. The payment processing system 100 may send the merchant 108 a message or a report regarding the inconsistent serial numbers from the batch that were not activated at the store.

The payment processing system 100 may maintain a transaction history for the portable consumer devices 112 that were handled by various merchants 108, for example, in a database on a server. The transaction history may include information such as: an indication of the change in state of an account corresponding to a consumer portable device, such as if the account has been activated, a value change that occurred with a change in state of the account, the date of a change in state, the location where the change in state was instigated, and an indication that there has been a suspected occurrence of fraud associated with the account.

By way of example and not by way of limitation, consider a doctor's office setting. In such a setting, a patient may obtain a portable consumer device 112 from the doctor's front desk and hand it to the doctor's agent. The doctor's agent may break an anti-tampering member of the portable consumer device 112 so as to expose the magnetic stripe 306 thereon. The doctor's agent may swipe the magnetic stripe 306 in the doctor's POS terminal having a magnetic stripe reader and being in communication with the payment processing system. The POS terminal may change the state of the account associated with the portable consumer device 112 by loading a data unit having to do with the patient's prescription that has been associate with the account. The doctor's agent may then give the opened portable consumer device 112 to the patient to take to the patient's pharmacy. The same portable consumer device 112 may be used to pay for services rendered to the patient by the doctor's practice. For example, the patient may give cash or a check to the doctor's agent who in turn loads the portable consumer device 112 with a monetary value equal to the amount of the patient's tendered cash or check that are received along with the patient's prescription. The doctor's agent may subtract the amount of the doctor's bill for services rendered to the patient from the value on the account that is associated with the portable consumer device 112, or the subtraction may occur prior to loading the portable consumer device 112.

In an alternative setting, the user 110 may dine at a restaurant. The user 110 may ask the waiter for the portable consumer device 112. The portable consumer device 112 may be a co-branded payment card that has a loyalty program associated with it. For example, the loyalty program may allow the user 110, who may be a restaurant patron, to use the payment card to get a free meal the next time the restaurant patron comes in to dine at the restaurant. The restaurant patron may give cash to the waiter to load onto the payment card, so that the wait staff can then deduct the dining bill from the now value loaded payment card. The waiter may take the portable consumer device 112 to the POS terminal, break the anti-tampering member on the portable consumer device 112 so as to expose the information bearing region on the payment card, load the payment card by interacting the information bearing region with a POS terminal while also deducting the dining bill, and then return the now exposed payment card to the restaurant patron. The next time the restaurant patron dines at the restaurant, the restaurant patron may use the payment card as a credit for a free meal as part of the loyalty program associated with the portable consumer device 112 and the payment card therein.

Although the invention has been discussed with respect to specific embodiments thereof, these embodiments are merely illustrative, and not restrictive, of the invention. For example, the present invention can be utilized with any authentication system. Thus, the scope of the invention is to be determined solely by the claims.

What is claimed is:

1. A portable consumer device comprising:
a substrate having an information bearing region, pertaining to a payment processing system, located on at least one of a first planar surface and a second, opposite planar surface of the substrate;
a cover including a front planar body and a back planar body each rotatably coupled to the substrate, the front planar body dimensioned to conceal the first planar surface;
and
a breakable anti-tampering member coupling the front planar body to the back planar body, the anti-tampering member being located within a hinge which rotatably couples each of the front planar body and the back planar body to the substrate, wherein:
when the anti-tampering member is unbroken, the anti-tampering member prevents rotation of the cover; and
when the anti-tampering member is broken, the cover is selectively rotatable about the substrate to allow or disallow access to the information bearing region.

2. The portable consumer device as defined in claim 1, wherein:
the cover is not frangible; and
the anti-tampering member is frangible.

3. The portable consumer device as defined in claim 1, wherein the substrate is selected from the group consisting of a payment card, a transponder, a gift card, a payroll card, a health care card, a wrist band, a keychain device, a security card, a non-reloadable card, a reloadable card, an access card, a smartcard, and a smart media card.

4. The portable consumer device as defined in claim 1, wherein the substrate comprises at least one of a volatile memory to store information for the information bearing region and a non-volatile memory to store information for the information bearing region.

5. The portable consumer device as defined in claim 1, wherein the information bearing region comprises a machine-readable region.

6. The portable consumer device as defined in claim 1, wherein the information bearing region includes a personal identification number.

7. The portable consumer device as defined in claim 1, wherein the information bearing region comprises a device for at least one of the following: receiving, transmitting, and transreceiving a radio frequency signal.

8. The portable consumer device as defined in claim 1, wherein the information bearing region comprise means for communicating with a point of service terminal selected from the group consisting of electrically communicating, magnetically communicating, and optically communicating with the point of service terminal.

9. The portable consumer device as defined in claim 1, wherein information stored by the information bearing region is selected from the group consisting of an account number of the payment processing system, an account holder's name, an activation state, an expiration date, a verification code, a value associated with an account of the payment processing system, and combinations of the forgoing.

10. The portable consumer device as defined in claim 1, wherein the payment processing system comprises an entity selected from the group consisting of an issuer, an acquirer, a transaction handler, a merchant, a user, and combinations thereof.

11. The portable consumer device as defined in claim 1, wherein the cover comprises an opaque material.

12. The portable consumer device as defined in claim 1, wherein the cover comprises radio frequency signal shielding.

13. The portable consumer device as defined in claim 1, wherein a hinge rotatably couples each of the front planar body and the back planar body to the substrate.

14. The portable consumer device as defined in claim 1, wherein the breakable anti-tampering member is permanently altered when broken.

15. The portable consumer device as defined in claim 1, further comprising another breakable anti-tampering member.

16. A portable consumer device comprising:
a payment card pertaining to a payment processing system, the payment card including:
a radio frequency device;
a first planar surface; and
a second, opposite planar surface;
a cover including a front planar body and a back planar body each rotatably coupled to the payment card, the front planar body dimensioned to conceal the first planar surface and the back planar body having dimensions to conceal the second, opposite planar surface of the payment card; and
a breakable anti-tampering member within a hinge that rotatably couples the front planar body to the back planar body, wherein:
when the anti-tampering member is unbroken, the anti-tampering member prevents rotation of the cover, and
when the anti-tampering member is broken, the cover is selectively rotatable about the payment card to allow and disallow electronic interaction of the radio frequency device with a point of service terminal for the payment processing system.

17. The portable consumer device as defined in claim 16, wherein the payment card is selected from the group consisting of a transponder, a gift card, a prepaid card, a payroll card, a health care card, a wrist band, a keychain device, a security card, a non-reloadable card, a reloadable card, an access card, a smartcard, and a smart media card.

18. The portable consumer device as defined in claim 16, wherein the breakable anti-tampering member is permanently altered when broken.

19. The portable consumer device as defined in claim 16, wherein the breakable anti-tampering member is located within a center of the hinge.

20. The portable consumer device as defined in claim 16, further comprising another breakable anti-tampering member located on an edge of the cover.

21. A method for obtaining information from a payment card having an anti-tampering member, the method comprising:
rotating a cover of the payment card about a hinge that rotatably connects a portion of the cover to the payment card to break the anti-tampering member located within the hinge, wherein the cover conceals the payment card including an information bearing region; and
causing the information bearing region to interact with a point of service terminal in communication with the payment processing system, wherein:
when the anti-tampering member is unbroken, the anti-tampering member prevents rotation of the cover; and
when the anti-tampering member is broken, the cover is selectively rotatable about the payment card to allow or disallow access to the information bearing region.

22. The method as defined in claim 21, further comprising forming a transaction authorization request transmission for delivery to the payment processing system, the transmission including information obtained from the interaction of the point of service terminal with the information bearing region of the payment card.

23. The method as defined in claim 21, further comprising:
sending a transaction authorization request, using the point of service terminal, to an issuer of the payment card for subsequent authorization of the transaction upon an account associated with the payment card and issued by an issuer;
receiving, at the point of service terminal, an indication that the transaction authorization request has been approved or not approved; and
changing, after receipt of the indication that the transaction authorization request has been approved, a state of the account selected from the group consisting of:
deactivating the account;
loading the account with a value;
reloading the account with a value;
transitioning a value associated with the account;
decreasing a value associated with the account;
increasing a value associated with the account;
transferring a value associated with the account; and
combinations of the foregoing.

24. The method as defined in claim 23, further comprising receiving a transaction history of the payment card from the payment processing system, the transaction history including at least one of: an indication of the change in state of the account, an indication of activation of the account, a value change that occurred with the change in state of the account, a date of the change in state of the account, a location where the change in state of the account was instigated, and an indication of fraud associated with the account.

25. The method as defined in claim 21, wherein rotating the cover causes the anti-tampering member to be permanently altered.

26. The method as defined in claim 25, wherein rotating the cover causes another anti-tampering member to be permanently altered.

27. The method as defined in claim 26, wherein the other anti-tampering member is located on an edge of the cover.

28. The method as defined in claim 21, wherein the anti-tampering member is located within a center of the hinge.

29. A method comprising:
breaking an anti-tampering member for a cover concealing an information bearing region of a payment card by pivoting the cover relative to the payment card about a hinge permanently coupling a portion of the cover to a portion of the payment card, the anti-tampering member being located within the hinge, and the information bearing region bearing information that includes data about an account associated with a payment processing system; and
causing the information bearing region of the payment card to interact with a point of service terminal, wherein:
the point of service terminal is in communication with the payment processing system;
when the anti-tampering member is unbroken, the anti-tampering member prevents rotation of the cover; and
when the anti-tampering member is broken, the cover is selectively rotatable about the payment card to allow or disallow access to the information bearing region.

30. The method as defined in claim 29, wherein breaking the anti-tampering member causes the anti-tampering member to be permanently altered.

31. The method as defined in claim 29, further comprising breaking another anti-tampering member for the cover by pivoting the cover about the hinge.

32. A merchant checkout comprising:
a point of service terminal in communication with a payment processing system; and
a rack for displaying a plurality of portable consumer devices, each portable consumer device having:

a substrate having an information bearing region, pertaining to a payment processing system, located on at least one of a first planar surface and a second opposite planar surface of the substrate;

a cover including a front non-frangible planar body and a back non-frangible planar body each rotatably coupled to the substrate, the front non-frangible planar body dimensioned to conceal the first planar surface; and a breakable anti-tampering member coupling the front non-frangible planar body to the back non-frangible planar body, the anti-tampering member being located within a hinge which rotatably couples each of the front non-frangible planar body and the back non-frangible planar body to the substrate, wherein:

when the anti-tampering member is unbroken, the anti-tampering member prevents rotation of the cover; and when the anti-tampering member is broken, the cover is selectively rotatable about the substrate to allow or disallow access to the information bearing region.

33. The merchant checkout as defined in claim 32, wherein the point of service terminal forms a transmission to the payment processing system, the transmission including information obtained from the interaction of the point of service terminal with the information bearing region of the portable consumer device.

34. The merchant checkout as defined in claim 32, wherein the breakable anti-tampering member is permanently altered when broken.

35. The merchant checkout as defined in claim 32, further comprising another breakable anti-tampering member.

* * * * *